United States Patent
Wegner et al.

(10) Patent No.: US 6,947,999 B1
(45) Date of Patent: Sep. 20, 2005

(54) UART WITH COMPRESSED USER ACCESSIBLE INTERRUPT CODES

(75) Inventors: Glenn Wegner, Cupertino, CA (US); Sun Man Lo, San Jose, CA (US)

(73) Assignee: Exar Corporation, Fremont, CA (US)

(*) Notice: Subject to any disclaimer, the term of this patent is extended or adjusted under 35 U.S.C. 154(b) by 0 days.

(21) Appl. No.: 09/528,089

(22) Filed: Mar. 17, 2000

(51) Int. Cl.⁷ .............................................. G06F 15/16

(52) U.S. Cl. ...................... 709/245; 709/232; 709/253; 710/1; 710/8

(58) Field of Search ............................... 709/232, 245, 709/253; 710/1, 8

(56) References Cited

U.S. PATENT DOCUMENTS

| | | | |
|---|---|---|---|
| 4,788,639 A | | 11/1988 | Tamaru |
| 4,949,333 A | * | 8/1990 | Gulick et al. ............... 370/282 |
| 5,619,544 A | * | 4/1997 | Lewis et al. ................ 375/377 |
| 5,857,108 A | | 1/1999 | Hong |
| 6,038,294 A | * | 3/2000 | Tran et al. ............... 379/93.07 |
| 6,272,452 B1 | * | 8/2001 | Wu et al. ...................... 703/24 |
| 6,470,404 B1 | * | 10/2002 | Kim ............................ 710/63 |

FOREIGN PATENT DOCUMENTS

| | | |
|---|---|---|
| EP | 0 535 821 A1 | 4/1993 |
| EP | 0 632 391 A2 | 1/1995 |

OTHER PUBLICATIONS

Philips Semiconductors; IC 19 Data Handbook; Integrated Circuit Data Sheet SCC2698B Enhanced octal universal asynchronous receiver/transmitter (Octal UART); Sep. 4, 1998; pp. 2-28.*

Phillips Semiconductors; IC 19 Data Handbook; Integrated Circuit Data Sheet SC28L198 Octal UART for 3.3V and 5V supply voltage; Jan. 14, 1999; pp. 2-56.*

* cited by examiner

*Primary Examiner*—Saleh Najjar
(74) *Attorney, Agent, or Firm*—Townsend and Townsend and Crew LLP

(57) ABSTRACT

An improved UART which has a number of channels, with each channel having a set of channel configuration registers. Each channel configuration register includes an interrupt source register. The interrupt source register has a multi-bit interrupt source code which is used to indicate the source of the interrupt. This code is chosen to be compatible with prior UART devices. The device also includes a bus interface, and a plurality of device configuration registers accessible through the bus interface by a user. One of the device configuration registers is an interrupt register which provides a user accessible code to indicate the interrupt source. The code used for the interrupt source is a compressed version of the multiple bit code used in the channel configuration interrupt source register. This compression allows more channels to be represented in a single register, while also conveying the interrupt source information quickly to the user. Since the device interrupt register in the configuration registers is for access by the user, rather than internal access by UART drivers, there is no need for compatibility with the prior UART drivers.

8 Claims, 3 Drawing Sheets

| PRIORITY | BIT [N+2] | BIT [N+1] | BIT [N] | INTERRUPT SOURCE(S) |
|---|---|---|---|---|
| x | 0 | 0 | 0 | None |
| 1 | 0 | 0 | 1 | RXRDY and RX Line Status |
| 2 | 0 | 1 | 0 | RXRDY Time-out |
| 3 | 0 | 1 | 1 | TXRDY, THR or TSR (auto RS485 mode) empty |
| 4 | 1 | 0 | 0 | MSR, RTS/CTS or DTR/DSR delta or Xoff/Xon det. or special char. detected |
| 5 | 1 | 0 | 1 | Reserved. |
| 6 | 1 | 1 | 0 | MPIO pin(s). Available only within channel 0, reserved in other channels. |
| 7 | 1 | 1 | 1 | TIMER Time-out. Available only within channel 0, reserved in other channels. |

*FIG. 3.*

RXRDY, RXRDY Time-out and Line Status Interrupt clears after reading LSR register that is in the UART channel register set.

TXRDY Interrupt clears after reading ISR register that is in the UART channel register set.

Modem Status Register Interrupt clears after reading MSR register that is in the UART channel register set.

RTS/CTS or DTR/DSR delta interrupt clears after reading MSR register that is in the UART channel register set.

Xoff/Xon delta and special character detect interrupt clears after reading the ISR register that is in the UART channel register set.

TIMER Time-out interrupt clears after reading the TIMERCNTL register that is in the Device Configuration register set.

MPIO Interrupt clears after reading the MPIOLVL register that is in the Device Configuration register set.

*FIG. 4.*

UART WITH COMPRESSED USER ACCESSIBLE INTERRUPT CODES

BACKGROUND OF THE INVENTION

The present invention relates to universal asynchronous receiver-transmitters (UARTs), and in particular to interrupt codes for such UARTs.

UARTs are used in many communications applications to convert data streams from parallel to serial, enabling a serial data stream to communicate with a central processing unit or CPU. UARTs have increased in complexity over the years, with a single UART being able to serve multiple channels. Interrupt registers have been provided for the different channels to flag certain events, such as line status, a ready time out, etc. Newer, more complex UARTs have had to be compatible with the codes used for the prior UARTs to maintain compatibility with drivers already in existence or other UARTs.

One feature that has been added to some UARTs is a bus interface, such as a PCI bus interface. A separate interrupt status register containing overall status for the multiple channels is included here, and is user accessible. Because of the need for backward compatibility, the same codes that have been used for interrupts are also used here and simply written into the interrupt register, which is accessible by the user over the bus. However, as the number of channels have increased, the number of register bits required for this has also increased, limiting what can be done in one general interrupt register.

SUMMARY OF THE INVENTION

The present invention provides an improved UART which has a number of channels, with each channel having a set of channel configuration registers. Each channel configuration register includes an interrupt source register. The interrupt source register has a multi-bit interrupt source code which is used to indicate the source of the interrupt. This code is chosen to be compatible with prior UART devices. The device also includes a bus interface, and a plurality of device configuration registers accessible through the bus interface by a user. One of the device configuration registers is an interrupt register which provides a user accessible code to indicate the interrupt source. The code used for the interrupt source is a compressed version of the multiple bit code used in the channel configuration interrupt source register. This compression allows more channels to be represented in a single register, while also conveying the interrupt source information quickly to the user. Since the device interrupt register in the configuration registers is for access by the user, rather than internal access by UART drivers, there is no need for compatibility with the prior UART drivers.

In a preferred embodiment, a 5-bit code compatible with the prior art codes is used in the channel configuration interrupt register. This is compressed to a 3-bit code for use in the device interrupt register. Preferably, a 32-bit device interrupt register is used, with three bits for each of eight channels. In addition, eight bits are provided to indicate which channel has an interrupt, with a single bit being used for this purpose for each channel. This invention in this embodiment is applicable to a PCI bus.

BRIEF DESCRIPTION OF THE DRAWINGS

FIG. 3 is a diagram of the compressed coding used for the device interrupt register of the invention.

FIG. 4 is a chart setting forth how the different interrupt codes are cleared.

DESCRIPTION OF THE SPECIFIC EMBODIMENTS

Figure 1:
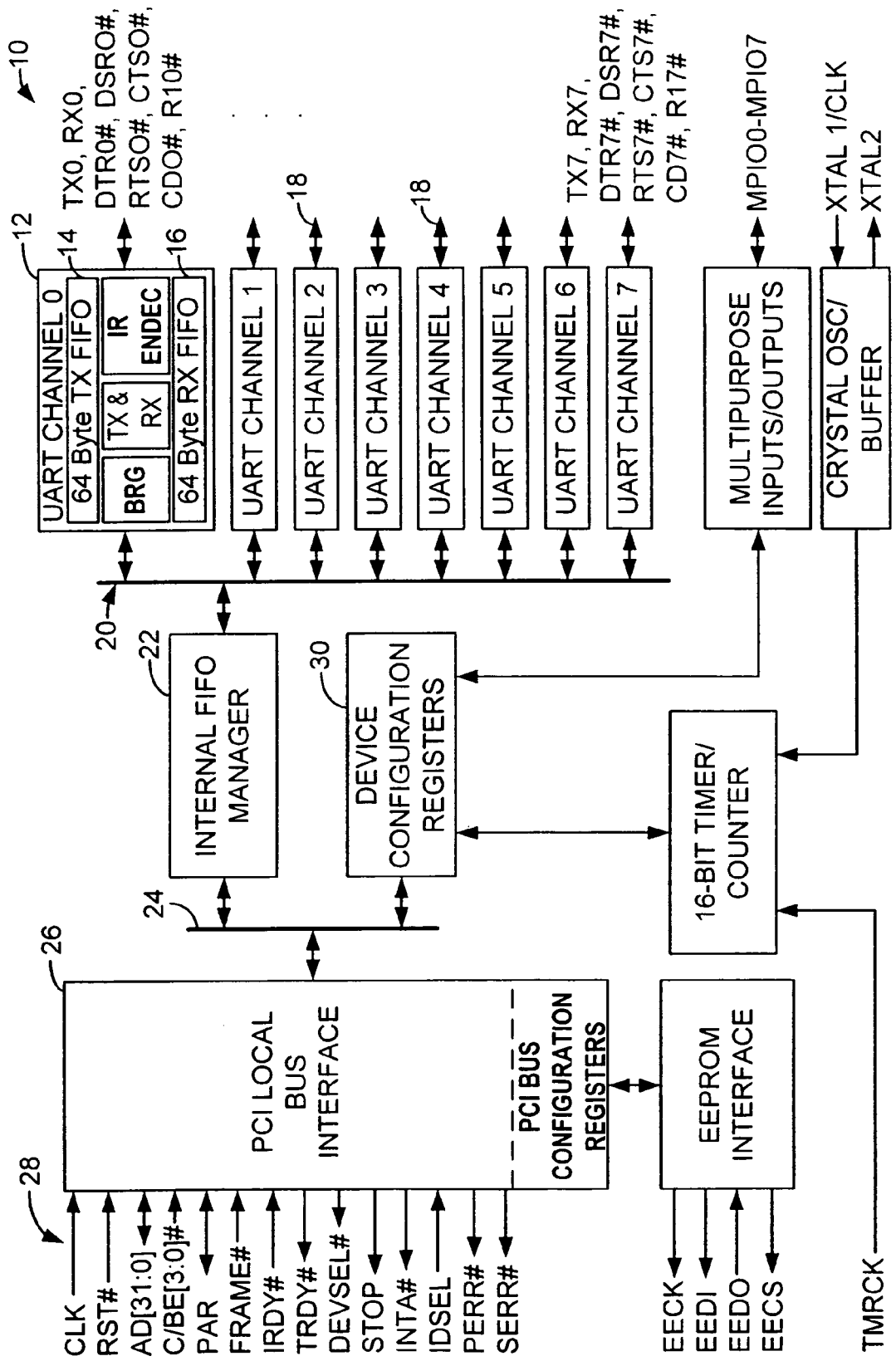
FIG. 1 is a block diagram of a UART incorporating the present invention.

FIG. 1 is a block diagram of a UART 10. The UART includes eight channels 12. Channel 0 indicates the internal circuitry for that channel, which is not shown but would be the same for the other eight channels. In particular, it has a 64-bit transmit first in/first out (FIFO) buffer 14 and a 64-byte receive FIFO 16. The channel also includes other control circuitry and registers. The channels interface via I/O lines 18 to serial data communication lines. The data can be provided through an internal bus 20 to an internal FIFO manager 22. The FIFO manager provides the data in both directions through a second internal bus 24 to a PCI local bus interface 26. This interfaces with a PCI bus 28.

Directly accessible by the PCI local bus interface 26 are a series of device configuration registers 30.

Figure 2:
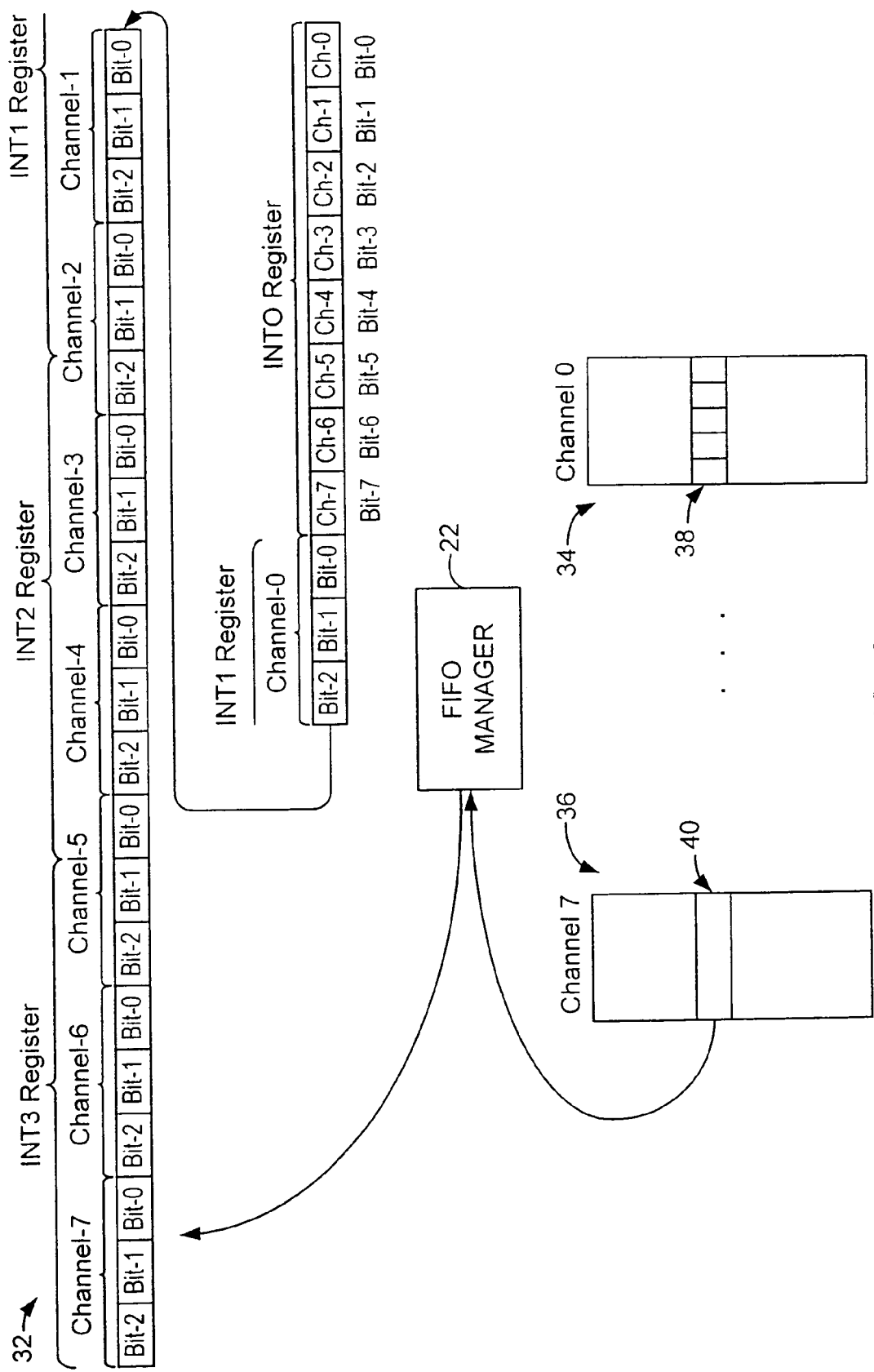
FIG. 2 is a diagram illustrating the different interrupt registers according to the invention.

FIG. 2 is a diagram illustrating a device interrupt register 32 which is contained within device configuration registers 30 of FIG. 1. Also shown are the channel configuration registers 34 and 36 for channels 0 and 7. Similar registers would be provided for the other channels. Each of these registers includes a channel interrupt register 38 and 40, respectively. Each of these registers would include a 5-bit interrupt source code which is written to the register when an interrupt is generated for that channel. When such an interrupt is generated and written, FIFO manager 22 will detect the interrupt and convert the code from a 5-bit code into a 3-bit code which is written into the corresponding position in device interrupt register 32. This compression is done by hardwired conversion circuitry.

The device interrupt register contains three bits indicating the source of the interrupt for each of the channels as indicated. FIG. 3 sets forth the different codes used and the corresponding interrupt sources. FIG. 4 sets forth how the different interrupts are cleared.

FIG. 2 also shows, at the end of device interrupt register 32, eight bits referred to as INT0 register, which is the 0 byte of the device interrupt register. These eight bits indicate which channel is the source of an interrupt so that the user can look at a single bit and determine which channel has the interrupt.

The interrupt status register supports two interrupt schemes. The first scheme is an 8-bit indicator representing all eight channels with each bit representing each channel from 0 to 7. This permits the interrupt routine to quickly vector and serve that UART channel and determine the sources(s) in each individual routines. INT0 bit-0 represents the interrupt status for UART channel 0 when its transmitter, receiver, line status, or modem port status requires service. Other bits in the INT0 register provide indication for the other channels with bit-7 representing UART channel 7, respectively.

The second scheme provides detail about the source of the interrupts for each UART channel. All the interrupts are encoded into a 3-bit code. This 3-bit code represents seven interrupts corresponding to an individual UART's transmitter, receiver, line status, modem port status. INT1, INT2 and INT3 registers provide the 24-bit interrupt status for all eight channels. Bits 8, 9 and 10 representing channel 0 and bits 29, 30 and 31 representing channel 7, respectively. All eight channel interrupts status are available with a single DWORD read operation. This feature allows the host to quickly vector and serve the interrupts, reducing the service interval, and hence reduce the host bandwidth requirement.

INT0 [7:0] Channel Interrupt Indicator. Each bit gives an indication of the channel that has requested service. Bit-0 represents channel 0 and bit-7 indicates channel 7. Logic one indicates the channel N [7:0] has called for service. The interrupt bit clears after reading the appropriate register of the interrupting channel register.

INT3, INT2 and INT1 [32:8] form a 24-bit encoded interrupt indicator. Each channel's interrupt is encoded into three bits for receive, transmit, and status. Bit [10:8] represents channel 0 and go up to channel 7 with bits [31:29]. The 3-bit encoding and their priority order are shown in FIG. 3. The Timer and MPIO interrupts are for the device and therefore they exist within channel 0 space and not in other channel interrupt.

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. A universal asynchronous receiver transmitter (UART) comprising:
    a plurality of channels;
    a plurality of sets of channel configuration registers, with each set of channel configuration registers corresponding to one of said plurality of channels;
    one of said channel configuration registers for each channel being a channel interrupt source register encoding in a multiple bit code a source of an interrupt for that channel, said multiple bit code being compatible with previous UART devices;
    a bus interface;
    a plurality of device configuration registers coupled to said bus interface and accessible directly from a bus by a user; and
    one of said device configuration registers being a device interrupt register having a user accessible code for indicating an interrupt source for each of said channels, said user accessible code having fewer bits than said multiple bit code in said interrupt source register in said channel configuration registers.

2. The UART of claim 1 wherein said multiple bit code is five bits.

3. The UART of claim 1 wherein said user accessible code is three bits for each channel.

4. The UART of claim 1 further comprising a plurality of interrupt channel bits in said device interrupt register, each of said interrupt channel bits corresponding to one of said channels.

5. The UART of claim 1 wherein said device interrupt register is a 32 bit register, and said UART includes eight channels.

6. The UART of claim 1 further comprising a FIFO manager configured to convert said multiple bit code from said channel interrupt source registers into said user accessible code.

7. The UART of claim 1 wherein said bus is a PCI bus.

8. A universal asynchronous receiver transmitter (CART) comprising:
    at least eight channels;
    a plurality of sets of channel configuration registers, with each set of channel configuration registers corresponding to one of said eight channels;
    one of said channel configuration registers for each channel being a channel interrupt source register encoding in a five bit code a source of an interrupt for that channel, said five bit code being compatible with previous UART devices;
    a PCI bus interface;
    a plurality of device configuration registers coupled to said PCI bus interface and accessible directly from a PCI bus by a user;
    one of said device configuration registers being a 32 bit device interrupt register having a user accessible code for indicating an interrupt source for each of said channels, said user accessible code being three bit interrupt codes corresponding to said five bit codes in said interrupt source register in said channel configuration registers; and
    a plurality of interrupt channel bits in said device interrupt register, each of said interrupt channel bits corresponding to one of said channels.

* * * * *